United States Patent
Choudary et al.

(10) Patent No.: US 10,717,940 B2
(45) Date of Patent: Jul. 21, 2020

(54) SUPPORTED CATALYST FOR SLURRY PHASE HYDROCRACKING OF REFINERY RESIDUE AND A PROCESS FOR ITS PREPARATION

(71) Applicant: HINDUSTAN PETROLEUM CORPORATION LIMITED, Mumbai (IN)

(72) Inventors: Nettem Venkateswarlu Choudary, Bangalore (IN); Kanuparthy Naga Raja, Bangalore (IN); Raman Ravishankar, Bangalore (IN); Bipul Sarkar, Bangalore (IN); Valavarasu Gnanesekaran, Bangalore (IN); Peddy Venkata Chalapathi Rao, Bangalore (IN); Sriganesh Gandham, Visakhapatnam (IN)

(73) Assignee: Hindustan Petroleum Corporation Limited, Mumbai (IN)

( * ) Notice: Subject to any disclaimer, the term of this patent is extended or adjusted under 35 U.S.C. 154(b) by 214 days.

(21) Appl. No.: 15/740,957

(22) PCT Filed: Jun. 17, 2016

(86) PCT No.: PCT/IB2016/053618
§ 371 (c)(1),
(2) Date: Dec. 29, 2017

(87) PCT Pub. No.: WO2017/001964
PCT Pub. Date: Jan. 5, 2017

(65) Prior Publication Data
US 2018/0195011 A1   Jul. 12, 2018

(30) Foreign Application Priority Data

Jun. 30, 2015   (IN) .......................... 2495/MUM/2015

(51) Int. Cl.
| | | |
|---|---|---|
| *B01J 37/04* | (2006.01) |
| *B01J 37/08* | (2006.01) |
| *B01J 27/04* | (2006.01) |
| *B01J 27/043* | (2006.01) |
| *B01J 27/045* | (2006.01) |
| *B01J 27/047* | (2006.01) |
| *B01J 27/049* | (2006.01) |
| *B01J 27/051* | (2006.01) |
| *B01J 21/04* | (2006.01) |
| *B01J 21/08* | (2006.01) |
| *B01J 21/18* | (2006.01) |
| *C10G 47/06* | (2006.01) |
| *C01B 32/162* | (2017.01) |
| *B01J 37/02* | (2006.01) |
| *B01J 37/34* | (2006.01) |
| *C10G 65/12* | (2006.01) |
| *B01J 21/12* | (2006.01) |
| *B01J 23/28* | (2006.01) |

(52) U.S. Cl.
CPC .............. *C10G 47/06* (2013.01); *B01J 21/18* (2013.01); *B01J 27/051* (2013.01); *B01J 37/0203* (2013.01); *B01J 37/343* (2013.01); *C01B 32/162* (2017.08); *C10G 65/12* (2013.01); *B01J 21/12* (2013.01); *B01J 23/28* (2013.01)

(58) Field of Classification Search
CPC .... B01J 37/0201; B01J 37/0236; B01J 37/04; B01J 37/08; B01J 27/04; B01J 27/043; B01J 27/045; B01J 27/047; B01J 27/049; B01J 27/051; B01J 21/04; B01J 21/08; B01J 21/18; B01J 21/185
See application file for complete search history.

(56) References Cited

U.S. PATENT DOCUMENTS

| | | | |
|---|---|---|---|
| 6,902,664 B2 | 7/2005 | Timken | |
| 2010/0326883 A1* | 12/2010 | Van Wees | ............ C10G 21/003 208/44 |
| 2011/0303583 A1* | 12/2011 | Bhattacharyya | ....... C10G 47/12 208/112 |
| 2015/0129463 A1* | 5/2015 | Alaei | ...................... B01J 31/34 208/112 |

* cited by examiner

*Primary Examiner* — Randy Boyer
(74) *Attorney, Agent, or Firm* — Sand, Sebolt & Wernow Co., LPA

(57) ABSTRACT

The present disclosure relates to a catalyst for slurry phase hydrocracking of refinery residue and a process for its preparation. The present disclosure provides a very simple method for exfoliation of metal sulphide, and a process of that provides effective slurry phase hydrocracking of refinery residue with a high yield.

5 Claims, No Drawings

US 10,717,940 B2

SUPPORTED CATALYST FOR SLURRY PHASE HYDROCRACKING OF REFINERY RESIDUE AND A PROCESS FOR ITS PREPARATION

FIELD

The present disclosure relates to a catalyst for slurry phase hydrocracking of refinery residue and a process for its preparation.

DEFINITIONS

As used in the present disclosure, the following words and phrases are generally intended to have the meaning as set forth below, except to the extent that the context in which they are used to indicate otherwise.

A sol composition: a sol composition is a colloidal suspension of very small solid particles in a continuous liquid medium. Sols are quite stable and exhibit the Tyndall effect. Artificial sols may be prepared by dispersion or condensation. Dispersion techniques include grinding solids to colloidal dimensions by ball milling and Bredig's arc method. The stability of sols may be maintained by using dispersing agents.

Triblock co-polymer: Block copolymers comprise two or more homopolymer subunits linked by covalent bonds. The union of the homopolymer subunits may require an intermediate non-repeating subunit, known as a junction block. Block copolymers with two or three distinct blocks are called diblock copolymers and triblock copolymers, respectively. Pluronic P123 is a type of triblock copolymer used in the method of this disclosure.

BACKGROUND

In refineries, petroleum feedstock is converted to valuable products, using different techniques. However, while converting the feedstock to valuable products, large quantity of residue is obtained. There is a need for the effective conversion of petroleum feedstock into desired petrochemical products and fuel feedstock with limited quantities of residue.

To limit residue production, different methods are employed like delayed coking, fluidized bed cracking, slurry phase hydrocracking for the up-gradation of refinery residue.

Hydrocracking of refinery residue requires high temperature, high pressure, and high hydrogen to oil ratio. Therefore, the conventional methods used for the hydrocracking may not be useful for residue up-gradation.

The use of catalyst-based systems for the cracking of the hydrocarbon feedstock is technically viable. However, the use of relatively expensive catalyst systems, catalyst deactivation, low quality of derived products and the need for catalyst recovery make these systems less viable for industrial applications. Different catalytic systems are used for the effective conversion of petroleum feedstock. However, many conventional catalysts cannot withstand the severe reaction conditions.

Another major drawback of the prior art processes is that they do not exhibit sufficiently high conversions of refinery residue at very low residence time and low catalyst concentrations, to be of interest for industrial applications. In most cases the catalyst is costly or suffers deactivation due to severe reaction conditions.

There is, therefore, an evident necessity for further improvements in the process for conversion of refinery residue.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide a catalyst for slurry phase hydrocracking of refinery residue.

Another object of the present disclosure is to provide a process for the preparation of a catalyst for slurry phase hydrocracking of refinery residue.

Still another object of the present disclosure is to provide a process for slurry phase hydrocracking of refinery residues in the presence of the catalyst of the present disclosure.

Other objects and advantages of the present disclosure will be more apparent from the following description, which is not intended to limit the scope of the present disclosure.

SUMMARY

In accordance with one aspect of the present disclosure there is provided a process for preparing a supported catalyst for slurry phase hydrocracking, the process comprises charging a vessel with a predetermined amount of metal sulphide and at least one fluid medium to obtain a first mixture; sonicating the first mixture to obtain an exfoliated product; mixing the exfoliated product with a predetermined amount of at least one support material to obtain a first slurry; heating the first slurry for a time period in the range of 12 to 60 hours at a temperature in the range of 10 to 80° C. to obtain a heated slurry; and drying and calcining the heated slurry under inert atmosphere to obtain the supported catalyst.

In accordance with the embodiments of the present disclosure, the metal sulphide comprises a metal selected from the group consisting of titanium, molybdenum, vanadium, chromium, manganese, iron, cobalt, nickel, zirconium, tungsten, ruthenium, rhodium, tin, tantalum, rhenium, and iridium.

In accordance with the embodiments of the present disclosure, the at least one support material is selected from the group consisting of pluronic P123, activated carbon, multi-wall carbon nanotubes, γ-alumina, and porous silica.

In accordance with the embodiments of the present disclosure, the weight ratio of the amount of the metal sulphide and the at least one support material is in the range of 1:10 to 1:1000.

In accordance with the embodiments of the present disclosure, the calcination is carried out at a temperature in the range of 300 to 550° C.

In accordance with another aspect of the present disclosure, there is provided a process for preparing a supported catalyst for slurry phase hydrocracking, the process comprises mixing a predetermined amount of at least one support material, a predetermined amount of at least one metal salt, and at least one fluid medium in a reactor at a temperature in the range of 10 to 80° C. to obtain a sol composition; ageing the sol composition to obtain an aged sol composition, followed by adding a predetermined amount of an acid to the aged sol composition and filtering to obtain a residue and a filtrate; drying and calcining the residue to obtain the supported catalyst for slurry phase hydrocracking.

In accordance with the embodiments of the present disclosure, the at least one support material is selected from the group consisting of pluronic P123, activated carbon, multiwall carbon nanotubes, γ-alumina, and porous silica.

In accordance with the embodiments of the present disclosure, the metal salt is selected from the group consisting of ammonium heptamolybdate, sodium molybdate, tungstic acid, and ammonium tungstate.

In accordance with the embodiments of the present disclosure, the weight ratio of the amount of the metal and the at least one support material is in the range of 1:20 to 1:1000.

In accordance with still another aspect of the present disclosure, there is provided a supported catalyst for slurry phase hydrocracking, which comprises an exfoliated product or a metal oxide supported on at least one support.

In accordance with still another aspect of the present disclosure, there is provided a process for slurry phase hydrocracking of the refinery residue using the supported catalyst, the process comprises charging a reactor with a predetermined amount of the supported catalyst and a predetermined amount of a refinery residue to obtain a mixture; introducing hydrogen gas in the reactor to attain a predetermined pressure to obtain a second mixture; and stirring the second mixture at a predetermined temperature for a predetermined time period to obtain the products.

In accordance with the embodiments of the present disclosure, the predetermined temperature is in the range of 200 to 500° C.

In accordance with the embodiments of the present disclosure, the weight ratio of the supported catalyst with respect to the refinery residue is in the range of 1:100 to 1:10000.

DETAILED DESCRIPTION

The present disclosure provides a metal based supported catalyst for slurry phase hydrocracking of refinery residue. The catalyst provides high yield during slurry phase hydrocracking process, thereby limiting the amount of residue. The catalyst of the present disclosure is an exfoliated metal sulphide or a metal oxide based catalyst supported on different support materials designed for slurry phase hydrocracking of refinery residue.

In accordance with one aspect of the present disclosure, there is provided a process for the preparation of a supported catalyst for slurry phase hydrocracking. The process comprises steps, which are described herein below.

A vessel is charged with a predetermined amount of a metal sulphide and at least one fluid medium to obtain a first mixture. The first mixture is exfoliated by sonicating it to obtain an exfoliated product. The exfoliated product is further mixed with a predetermined amount of at least one support material to obtain a slurry, which is then heated at a temperature in the range of 10 to 80° C. for a time period in the range of 12 to 60 hours to obtain a heated slurry. The heated slurry is dried and calcined under inert atmosphere to obtain the supported catalyst.

In accordance with the embodiments of the present disclosure, the metal sulphide comprises a metal selected from the group consisting of titanium, molybdenum, vanadium, chromium, manganese, iron, cobalt, nickel, zirconium, tungsten, ruthenium, rhodium, tin, tantalum, rhenium, and iridium.

In accordance with the embodiments of the present disclosure, the at least one support material is selected from the group consisting of activated carbon, multiwall carbon nanotubes, γ-alumina, and porous silica.

In accordance with the embodiments of the present disclosure, the weight ratio of the amount of the metal sulphide and the at least one support material is in the range of 1:10 to 1:1000.

In accordance with the embodiments of the present disclosure, the step of calcination is carried out at a temperature in the range of 200 to 550° C.

In accordance with the embodiments of the present disclosure, the at least one fluid medium is selected from the group consisting of amines and alcohols.

In accordance with one embodiment of the present disclosure, the fluid medium is N-methyl pyrrolidone (NMP).

In accordance with another aspect of the present disclosure, there is provided a process for preparing the supported catalyst for slurry phase hydrocracking. The process comprises the steps, which are described herein below.

A sol composition is prepared by mixing a predetermined amount of at least one support material, a predetermined amount of at least one metal salt, and at least one fluid medium in a reactor at a temperature in the range of 10 to 80° C. The so obtained sol composition is aged for a time period in the range of 3 to 15 hours to obtain an aged sol composition. A predetermined amount of an acid is added to the aged sol composition followed by filtering to obtain a residue and a filtrate. The residue is dried and calcined to obtain the supported catalyst for slurry phase hydrocracking.

In accordance with the embodiments of the present disclosure, the metal of the metal salt is at least one selected from a group consisting of titanium, vanadium, chromium, manganese, iron, cobalt, nickel, zirconium, niobium, molybdenum, tungsten, ruthenium, rhodium, tin, tantalum, rhenium and iridium. The metal salt includes, but is not limited to, ammonium heptamolybdate, sodium molybdate, tungstic acid, tungsten sulphide, chromium sulphide, tin sulphide and ammonium tungstate. The metal salt used in the synthesis of the catalyst, acts as the source of the metal.

In accordance with one embodiment of the present disclosure, the metal salt is ammonium heptamolybdate.

In accordance with the embodiments of the present disclosure, the at least one support material is selected from the group consisting of Pluronic P123, activated carbon, multiwall carbon nanotubes, γ-alumina, and porous silica.

In accordance with the embodiments of the present disclosure, the weight ratio of the amount of the metal and the at least one support material is in the range of 1:20 to 1:1000.

In accordance with the embodiments of the present disclosure, the at least one fluid medium is selected from the group consisting of water, methanol, ethanol, and isopropanol.

In accordance with the embodiments of the present disclosure, the pH of the sol composition is maintained in the range of 1 to 3.

In accordance with still another aspect of the present disclosure, there is provided a supported catalyst for slurry phase hydrocracking. The supported catalyst of the present disclosure comprises an exfoliated metal sulphide or metal oxide supported on at least one support material.

In accordance with yet another aspect of the present disclosure there is provided a process for slurry phase hydrocracking of refinery residue. The process comprises the following steps:

a reactor is charged with a predetermined amount of a catalyst and a predetermined amount of a refinery residue to obtain a first mixture;

hydrogen gas is introduced in the reactor to attain a predetermined pressure to obtain a second mixture; and the second mixture is stirred at a predetermined temperature for a predetermined time period to obtain the products.

The obtained products were analyzed using a refinery gas analyzer and High-Temperature Simulated Distillation.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

Experiment 1: Preparation of $MoS_2/C$ Catalyst 0.2 g $MoS_2$ was mixed with 20 mL of N-Methyl-2-pyrrolidone (NMP) in a flask to obtain a mixture. The mixture was sonicated in water for 30 minutes, followed by probe sonication for 2 hours in an ice bath. The resultant solution was mixed with 2 g of an activated carbon. After stirring for 12 hours at room temperature, a gel was obtained, which was dried on rotary evaporator under reduced pressure.

The catalyst obtained was $MoS_2/C$ with 6 wt % of Mo, 4 wt % of S and 90 wt % of C.

Experiment 2: Preparation of $MoO_3$ Based Supported Catalyst 0.5 g of triblock copolymer P123 was charged in a reactor containing double distilled water to obtain a solution. The solution was vigorously stirred for 2 hours to obtain a homogenized solution. 10 g of ammonium heptamolybdate $((NH_4)_6Mo_7O_{24}\cdot 4H_2O)$, was added to the vigorously stirred solution to obtain a reaction mixture. The reaction mixture was aged for 8 hours to obtain an aged mixture. 1M $HNO_3$ was added to the aged mixture to maintain the pH of the aged mixture at 1.5. The reaction mixture was filtered to obtain a solid residue and a filtrate. The solid residue was washed with ethanol and dried at 110° C., for 24 hours, followed by calcination at 550° C. for 5 hours to obtain $MoO_3$ catalyst.

Experiment 3: Slurry Phase Hydrocracking Using $MoO_3$ Based Catalyst

This experiment describes the slurry phase hydrocracking of residue in the presence of hydrogen using $MoO_3$ based catalyst.

0.125 g of $MoO_3$ and 250 g of a vacuum residue were taken in a batch reactor. The reactor was purged with nitrogen to remove any air trapped inside and later it was pressurized with Hydrogen to attain a pressure of 10 MPa. The reaction mixture was heated to 120° C., under continuous stirring at 1000 rpm to obtain a slurry. The temperature was then increased to 420° C. Heating was continued for 1 hour. After 1 hour the reaction was quenched by circulating chilled water to bring down the temperature below 300° C. The gaseous products were collected in a gas bomb and were analyzed using gas chromatography. The liquid and solid samples were collected and analyzed in GC-SIMDIST as per ASTM D-7169.

The same experiment was conducted for two hours separately with the same reaction charge. The details of the analysis are provided in Table 1.

TABLE 1

Activity Tests using $MoO_3$ based catalyst

| Reaction Time | Product Yield | | | Conversion of >540° C. Cut |
|---|---|---|---|---|
| | Gas | Liquid | Solids | |
| 1 | 11% | 32% | 57% | 63% |
| 2 | 13% | 61% | 26% | 74% |

It is observed that the residue fraction boiling above 540° C. in feed converted into lighter hydrocarbons and the conversion achieved is in the range of 63% and 74% for 1 hour and 2 hours reaction time respectively.

Experiment 4: Slurry Phase Hydrocracking Using $MoS_2/C$ as a Catalyst 0.125 g of $MoS_2/C$ and 250 g of a vacuum residue were taken in a batch reactor. The reactor was purged with nitrogen to remove any air trapped inside and later was pressurized to 10 MPa with Hydrogen. The reaction mixture was heated to 120° C. under continuous stirring at 1000 rpm to obtain a slurry. The temperature was then increased to 420° C. Heating was continued for 1 hour. After 1 hour the reaction was quenched by circulating chilled water to bring down the temperature below 300° C. The gaseous products were collected in a gas bomb and were analyzed using gas chromatography. The liquid and solid samples were collected and analyzed in GC-SIMDIST as per ASTM D-7169. The results of this experiment are given in Table 2.

TABLE 2

Activity Tests using $MoS_2/C$ Catalyst

| Reaction Time | Product Yield | | | Conversion of >540° C. Cut |
|---|---|---|---|---|
| | Gas | Liquid | Solids | |
| 1 | 17% | 46% | 37% | 63% |

It was observed from experiment 4 that for a shorter residence time of 1 hour, the molybdenum based catalyst synthesized by impregnating on activated carbon gives a conversion of 63% at such very low concentration in the feed. A higher conversion with less solid make is envisaged at higher residence times and high catalyst concentration.

Technical Advancements

The present disclosure described herein above has several technical advantages including, but not limited to, the realization of:

a supported catalyst for slurry phase hydrocracking of refinery residue; and a process that provides effective slurry phase hydrocracking of refinery residue with a high yield.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for preparing a supported catalyst for slurry phase hydrocracking, the catalyst comprising exfoliated metal sulphide, said process comprising the following steps:

i. charging a vessel with a predetermined amount of metal sulphide and at least one fluid medium to obtain a first mixture comprising metal sulphide;
   ii. sonicating said first mixture to obtain a resultant mixture comprising an exfoliated metal sulphide;
   iii. mixing said exfoliated metal sulphide with a predetermined amount of at least one support material to obtain a slurry;
   iv. heating said slurry for a time period in the range of 12 to 60 hours at a temperature in the range of 10 to 80° C. to obtain a heated slurry; and
   v. drying and calcining said heated slurry under inert atmosphere to obtain the supported catalyst comprising exfoliated metal sulphide.

2. The process as claimed in claim 1, wherein said metal sulphide comprises a metal selected from the group consisting of titanium, molybdenum, vanadium, chromium, manganese, iron, cobalt, nickel, zirconium, tungsten, ruthenium, rhodium, tin, tantalum, rhenium, and iridium.

3. The process as claimed in claim 1, wherein said at least one support material is selected from the group consisting of activated carbon, multiwall carbon nanotubes, γ-alumina, and porous silica.

4. The process as claimed in claim 1, wherein the weight ratio of the amount of said metal sulphide and said at least one support material is in the range of 1:10 to 1:1000.

5. The process as claimed in claim 1, wherein said calcination is carried out at a temperature in the range of 300 to 550° C.

* * * * *